(12) United States Patent
Mayse

(10) Patent No.: US 11,752,642 B2
(45) Date of Patent: Sep. 12, 2023

(54) GRIPPER HEAD AND MODULAR GRIPPER HEAD

(71) Applicant: Mid Atlantic Machinery, Harrisburg, PA (US)

(72) Inventor: Joshua C. Mayse, Bloomsburg, PA (US)

(73) Assignee: Mid Atlantic Machinery, Harrisburg, PA (US)

(*) Notice: Subject to any disclaimer, the term of this patent is extended or adjusted under 35 U.S.C. 154(b) by 179 days.

(21) Appl. No.: 17/190,951

(22) Filed: Mar. 3, 2021

(65) Prior Publication Data

US 2022/0048202 A1 Feb. 17, 2022

Related U.S. Application Data

(60) Provisional application No. 63/064,246, filed on Aug. 11, 2020.

(51) Int. Cl.
*B25J 15/00* (2006.01)
*B25J 15/06* (2006.01)

(52) U.S. Cl.
CPC ....... *B25J 15/0061* (2013.01); *B25J 15/0616* (2013.01)

(58) Field of Classification Search
CPC .... B25J 15/0616; B25J 15/0061; B25J 15/04; B25B 11/005; B23Q 3/088
See application file for complete search history.

(56) References Cited

U.S. PATENT DOCUMENTS

| 4,585,260 A | * | 4/1986 | Skovajsa | B25J 15/00 414/744.1 |
| 2020/0047352 A1 | * | 2/2020 | Nakayama | B65G 47/91 |
| 2020/0078939 A1 | * | 3/2020 | Jeong | B25J 9/1697 |

* cited by examiner

*Primary Examiner* — Tyrone V Hall, Jr.
(74) *Attorney, Agent, or Firm* — Walter Ottesen, P.A.

(57) ABSTRACT

A gripper head is for a robotic gripping system. The gripper head body has an attachment section and a tool section defining an attachment region for a tool. The attachment section is configured to attach the gripper head body to a mount of a robot. The gripper head body has a first port at the attachment section and a second port at the tool section. The gripper head body defines an internal channel mutually connecting the first port and the second port. The internal channel is configured to pass air between the first port at the attachment section and the second port at the tool section.

20 Claims, 10 Drawing Sheets

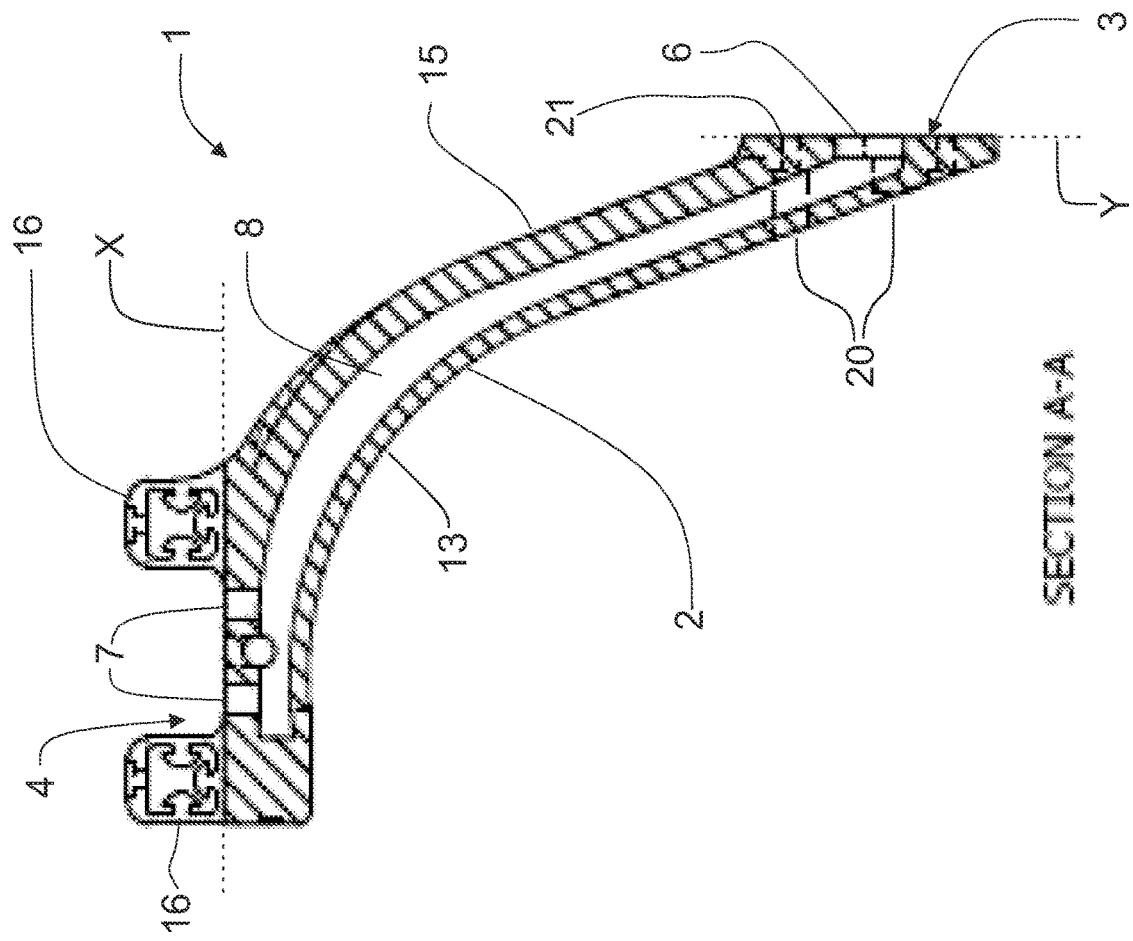
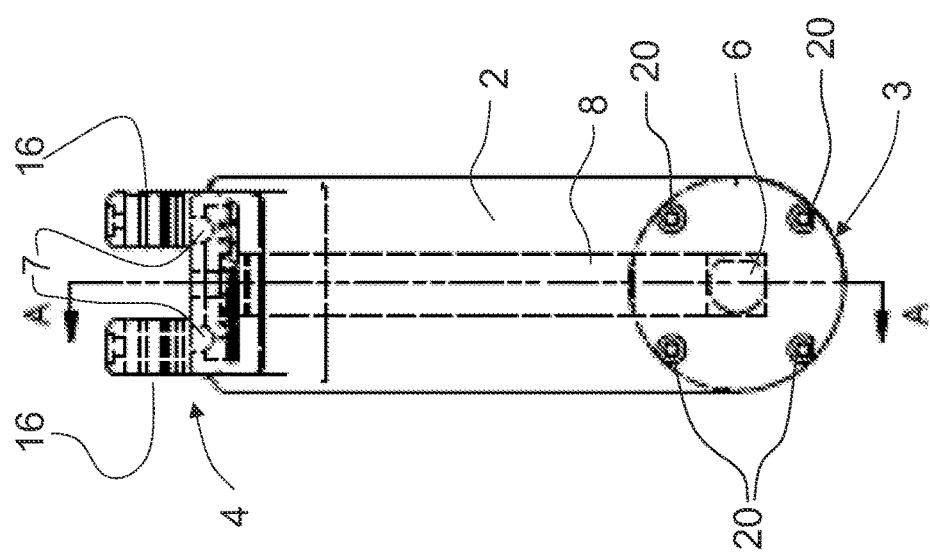

GRIPPER HEAD AND MODULAR GRIPPER HEAD

CROSS REFERENCE TO RELATED APPLICATION

This application claims priority of U.S. provisional patent application No. 63/064,246 and filed on Aug. 11, 2020, the entire content of which is incorporated herein by reference.

FIELD OF THE INVENTION

The disclosure relates to robotic gripper heads and gripper head assemblies.

BACKGROUND OF THE INVENTION

The robotics landscape is rapidly changing with the introduction of collaborative robots. Robots are working beside humans and able to be deployed for a constantly growing number of tasks. With this comes the ability to use a single robot for many different tasks. Robots need to be rapidly redeployed and adapted to different workpieces or tasks. Different sizes, types, and shapes of material need to be transported via the robot. This requires many different robot process end effectors to be developed and maintained. Gripping can be a challenge for a robot being deployed to do many different tasks or handling many different workpieces. Development of grippers for new workpieces can be very costly and take an extended period of time to develop. Maintaining a large library of robot end effectors to handle different workpieces or jobs can be very costly.

SUMMARY OF THE INVENTION

It is an object of the invention to provide a gripper head which can be quickly and effectively exchanged and/or adapted for different workpieces or tasks.

The aforementioned object can, for example, be achieved by a gripper head having a gripper head body having an attachment section and a tool section defining an attachment region for a tool; the attachment section being configured to attach the gripper head body to a mount of a robot; the gripper head body having a first port at the attachment section and a second port at the tool section; the gripper body defining an internal channel mutually connecting the first port and the second port; the internal channel defining a cross-sectional area and being configured to pass air between the first port at the attachment section and the second port at the tool section; and, the cross-sectional area of the internal channel, in at least a segment of the internal channel, increasing in a direction away from the attachment section.

The aforementioned object can, for example, further be achieved by a gripper head having a gripper head body having an attachment section and a tool section defining an attachment region for a tool; the attachment section being configured to attach the gripper head body to a mount of a robot; the gripper head body having a first port at the attachment section and a second port at the tool section; the second port being configured to receive an air hose connector; the gripper body defining an internal channel mutually connecting the first port and the second port; and, the internal channel being configured to pass air between the first port at the attachment section and the second port at the tool section.

The aforementioned object can, for example, also be achieved by a gripper head assembly having a gripper head body having an attachment section and a tool section; the attachment section being configured to attach the gripper head body to a mount of a robot; a profile section; at least one fitting disposed at the tool section and configured to receive and hold the profile section; an air hose having a first end and a second end; the gripper body defining an internal channel; the gripper head body having a first port at the attachment section and a second port at the tool section, wherein the internal channel connects the first port to the second port; the second port being configured to receive the first end of the air hose; the internal channel being configured to pass air between the first port at the attachment section and the second port at the tool section; a suction cup having an attachment stem; a suction cup mount having a vacuum cup receptacle configured to receive the attachment stem of the suction cup and an air hose receiver configured to receive the second end of the air hose; the suction cup mount defining a profile slip fit pocket configured to engage the profile section and mount the suction cup mount on the profile section; a change mount; and, the change mount including a vacuum generator configured to connect to the first port and generate a vacuum in the internal air channel.

A modular, quick change robotic gripper system is configured to move a large range of workpieces to secondary processes. An example of this is moving sheet metal parts to a press brake or a finishing machine for deburring. The system includes a vacuum generator mounted to the end of the robot, known as the wrist. Different gripper heads can be quickly and easily changed from the vacuum generator. This connection can be made in various ways. Examples of attachment methods could be using socket head cap screws to affix the gripper head to the vacuum generator or using an existing change tool coupling system. The gripper heads can have internal passages for vacuum, compressed air, and/or wiring connections. The connections can be made via an internal channel for conveying air and internal passages for wires, tubing and the like. Gripper heads can have multiple quick change or adjustment tooling options incorporated into them. The tooling incorporated into the gripper head can include many different options. Some relevant examples are suction cups, mechanical fingers for grabbing workpieces, and magnets for grabbing workpieces. The gripping components can all be interchangeable across the system.

Tooling components can be mounted in a pocket in the gripper body or mounted, for example, on a piece of standard profile made of extruded aluminum. Tooling components can all be made from lightweight materials, such as lightweight high strength carbon fiber included polymers. By using such materials, the overall weight of the gripping system can be greatly reduced. Reduction in tooling weight results in more efficient robot operation. The robot requires less power to make movements. The robot is able to move faster and acceleration/deceleration maneuvers can be achieved quicker thus improving overall cycle time. This reduction in gripper weight leaves more of the robot's maximum payload available for the workpiece itself.

The gripping system is capable of accepting many different tool plates on a standardized hub of a gripping system. This tool plate can quickly be changed by removing two socket head cap screws and unhooking quick disconnects for vacuum, air, and electrical. The quick-change plate system can be applied to a variety gripping head configurations. This allows the system to cover many different workpiece configurations using the same expensive components as a base for the quick-change system. This saves time and money. Parts of the gripper head can be changed in minutes. As a result, the robot can be more rapidly and easily redeployed to perform other tasks.

BRIEF DESCRIPTION OF THE DRAWINGS

The invention will now be described with reference to the drawings wherein:

FIG. 6A shows the gripper head of FIG. 5 with an internal channel shown;

FIG. 6B is a section view along line A-A of FIG. 6A;

DESCRIPTION OF THE PREFERRED EMBODIMENTS OF THE INVENTION

Figure 1:
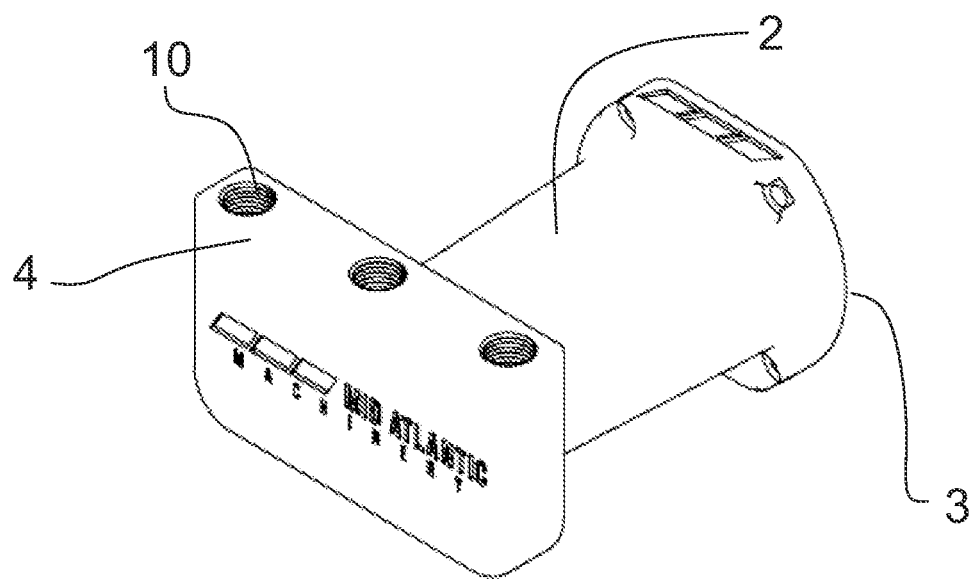
FIG. 1 shows a gripper head according to the disclosure.

FIG. 1 shows an embodiment of a gripper head 1. The gripper head 1 shown in FIG. 1 can, for example, be used for small parts which only require vacuum for manipulation and which cannot be effectively gripped by modular versions. These heads can be quickly and easily manufactured using additive manufacturing techniques. The gripper head 1 includes a gripper head body 2. In an embodiment, the gripper head body 2 can be attached to, for example, a robotic arm via a quick-change mount 5. In the embodiment, the quick-change mount 5 includes a vacuum generator and forms an interface between the gripper head 1 and the robotic arm. Connectors 9 can be used to fasten the gripper head 1 to the quick-change mount 5. The connectors 9 can be in the form of fasteners, however, other connections can be used to connect the gripper head 1 to the quick-change mount 5, such as a snap-fit connection etc.

The gripper head body 2 can, for example, be a light weight carbon fiber included polymer gripper head body 2. The gripper head body 2 has an attachment section 3 whereat the gripper head body 2 can be connected to the quick-change mount 5. The gripper head body 2 further has a tool section 4 which defines an attachment region for a tool. The gripper head body 2 can include an intermediate section 14 (See FIG. 3C). The top of tool section 4 defines a plane X and the attachment section defines a plane Y. The intermediate section 14 projects horizontally from the attachment section 3 to the tool section 4. In the embodiment shown in FIGS. 1 and 3C, the tool section 4 extends perpendicularly with respect to the intermediate section 14. Further, the plane X defined by the top of the tool section 4 extends perpendicular to the plane Y defined by the attachment section 3.

The gripper head 1 includes a first port 6 at the attachment section 3 and a second port 7 at the tool section 4. The gripper head body 2 defines an internal channel 8. The internal channel 8 interconnects the first port 6 and the second port 7. Suction or pressure generated by a vacuum generator, compressor or the like can be communicated from the first port 6 through the gripper head body 2 to the second port 7 at the tool section 4. The vacuum generator and/or compressor can be integral with the quick-change mount 5.

Figure 2:
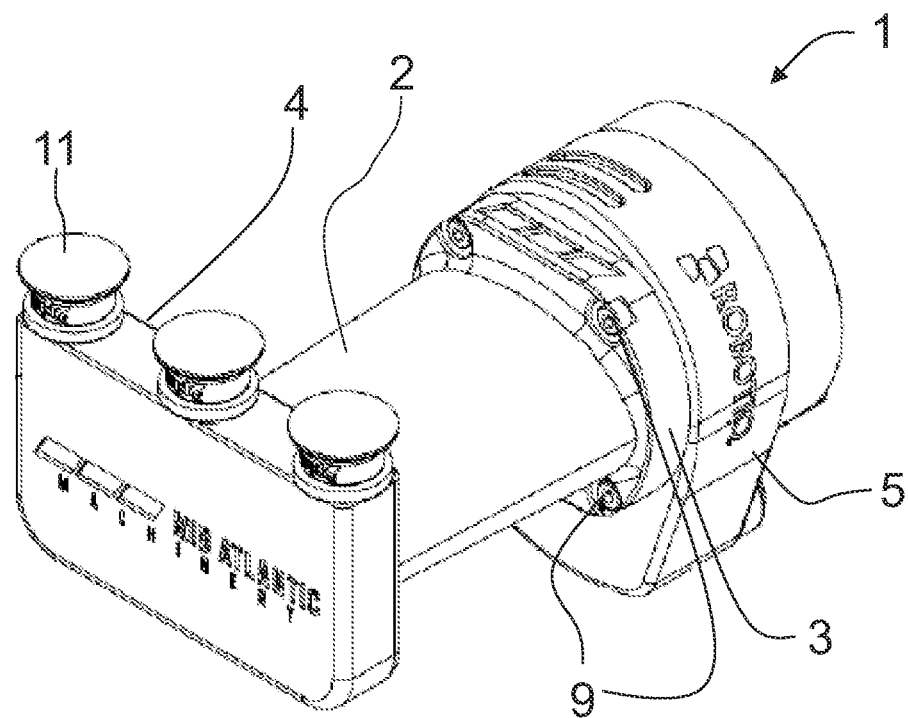
FIG. 2 shows the gripper head of FIG. 1 attached to a quick-change mount and having suction cups mounted at the tool section of the gripper head.
Figure 4:
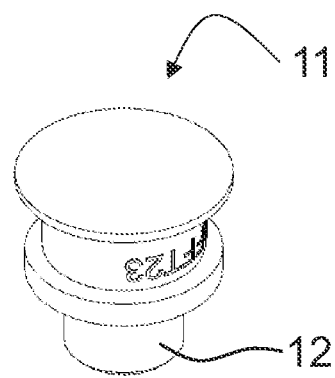
FIG. 4 shows a suction cup.

The tool section 4 can define a receptacle 10 for tools. In the embodiment shown in FIG. 1, the gripper head 1 has three tool receptacles 10 which can each have a suction cup 11 mounted therein. FIG. 2 shows the gripper head 1 with suction cups 11 mounted in the receptacles 10. The suction cup 11 can have a suction cup stem 12 configured to be inserted into the receptacle 10 (FIG. 4). The gripper head 1 of FIG. 2 is further attached to a quick-change mount 5. The gripper head 1 of FIG. 2 further has a suction cup 11 mounted in each receptacle 10. The internal channel 8 can be connected to each of the receptacles 10 and, as a result, to the suction cups 11. The internal channel 8 can be dimensioned so as to connect to each receptacle 10. The internal channel 8 can also include branches wherein the branches connect the main portion of the internal channel 8 to the receptacles 10.

Figure 3A:
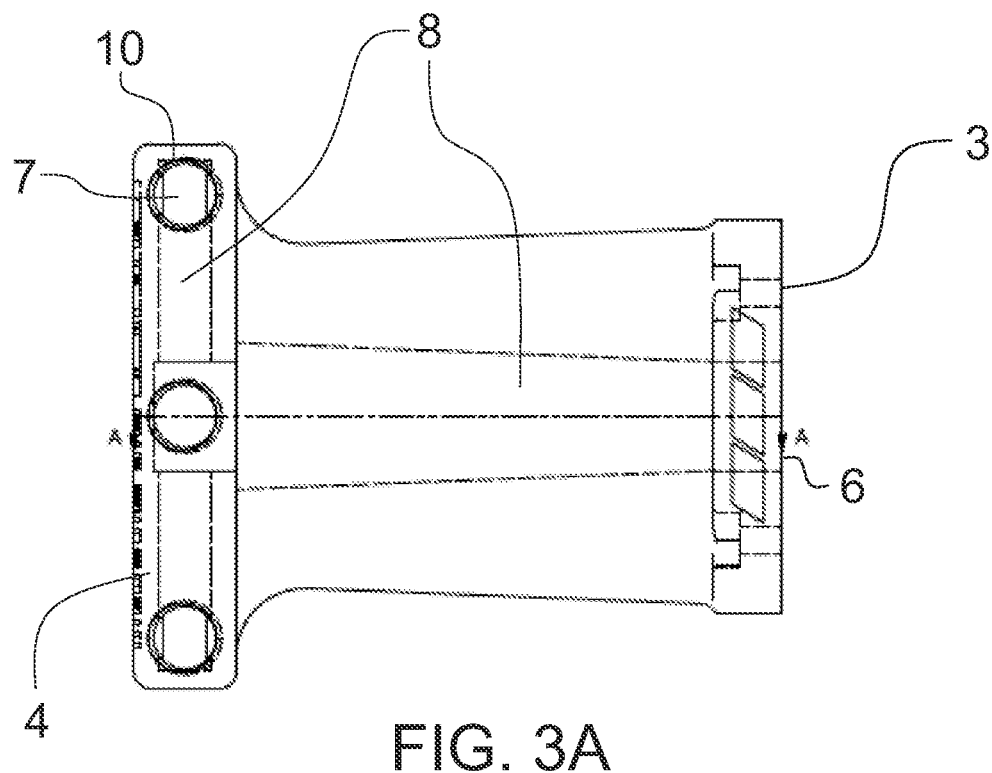
FIG. 3A shows an internal channel of the gripper head of FIG. 1 in a top plan section view.
Figure 3B:
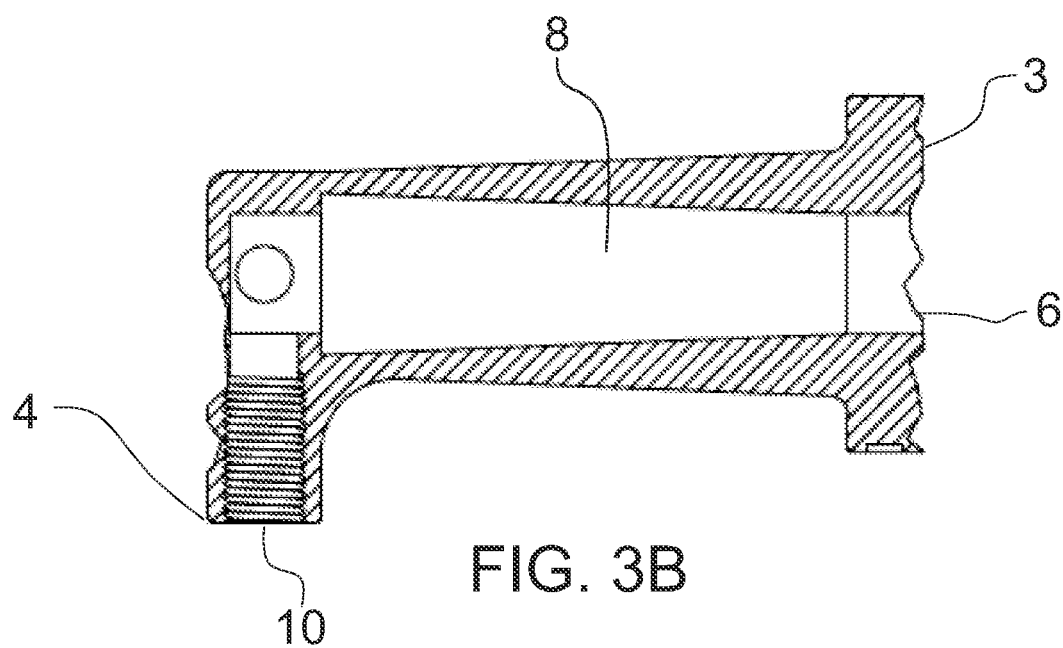
FIG. 3B shows the internal channel in a side elevation section view of the gripper head of FIG. 1.
Figure 3C:
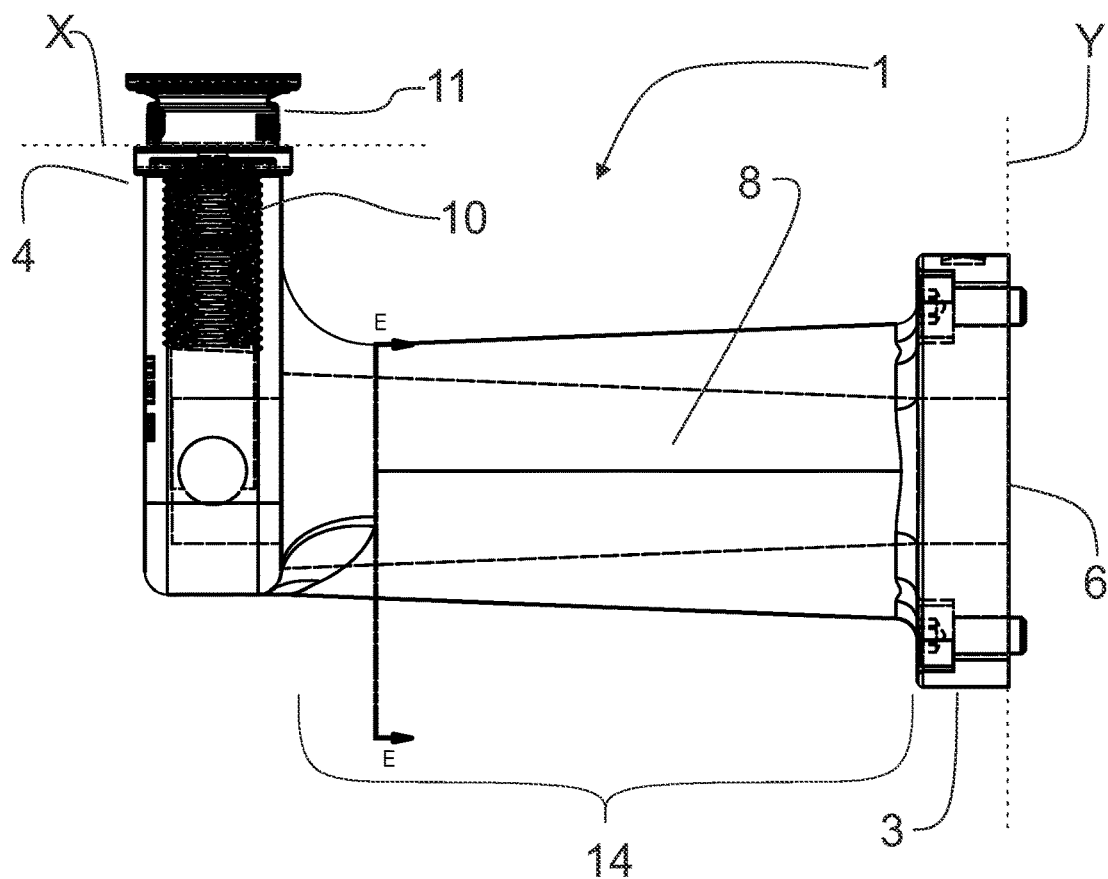
FIG. 3C shows the gripper head and the internal channel in side elevation section view of the gripper head of FIG. 1.

In the embodiment shown in a top plan view in FIG. 3A, the internal channel 8 widens in the tool section 4 so that each receptacle 10 is connected to the internal channel 8.

Figure 3D:
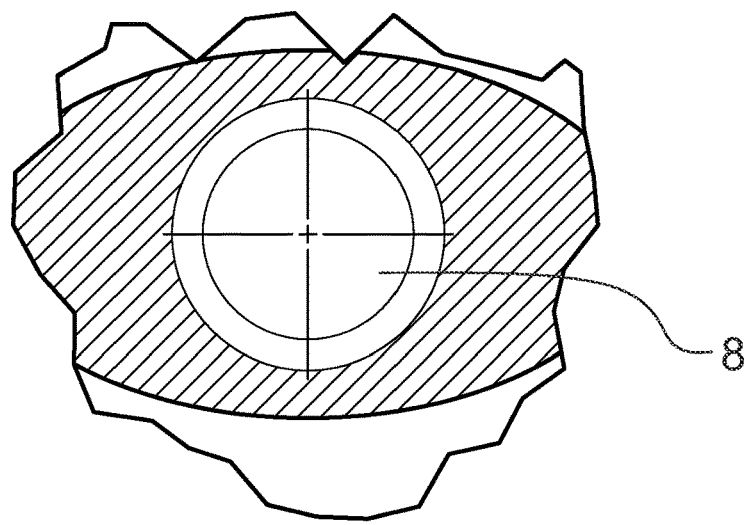
FIG. 3D shows the internal channel along the section E-E of FIG. 3C.

Further, in the embodiment shown in FIGS. 3A to 3D, the cross-sectional area of the internal channel 8 tapers toward the attachment section 3 and widens toward the tool section 4. An increasing cross-sectional area of the internal channel 8 with increasing distance to the attachment section 3 can improve the air flow characteristics through the gripper head body 2. The cross-sectional area of the internal channel may increase in a direction away from the attachment section along the entirety of the internal channel or in a segment thereof. As a result of the internal channel 8 being narrower toward the attachment section 3, the rate of air flow can be increased. FIG. 3D shows the internal channel via a section view along E-E of FIG. 3C in the direction of the attachment section 3.

Figure 5:
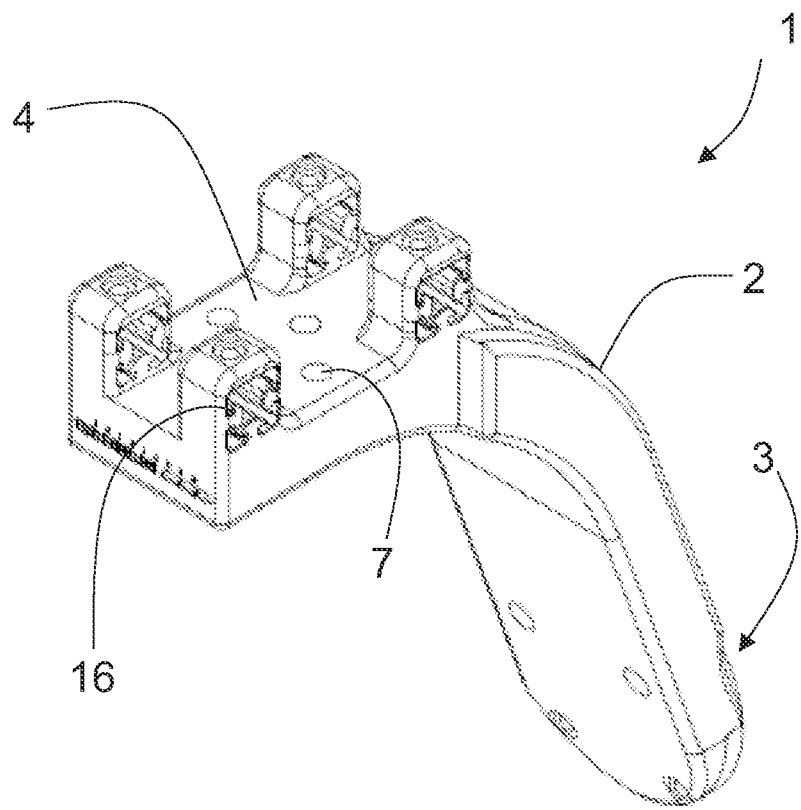
FIG. 5 shows a further embodiment of a gripper head body according to the disclosure.
Figure 9:
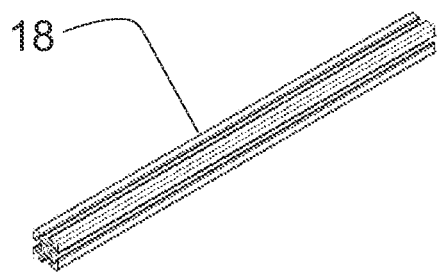
FIG. 9 shows an embodiment of a profile section.

FIG. 5 shows a further embodiment of the gripper head 1 according to the disclosure. The gripper head body 2 includes an attachment section 3 for attaching the gripper head 1 to a mount, for example, a quick-change mount 5. The gripper head body 2 further has a tool section 4. A fitting 16 is disposed at the tool section 4. The fittings 16 can be slip pockets for extrusion mounting as shown in FIG. 5. In the embodiment shown in FIG. 5, four fittings 16 are provided at the tool section 4. The fitting 16 of FIG. 5 is configured to receive a profile section and hold the profile section therein. The fitting 16 may include a bore for a fastener or the like for retaining a profile section 18 in the fitting 16. An example of a profile section 18 is shown in FIG. 9. The embodiment shown in FIG. 5 includes multiple second ports 7. The second ports 7 can, for example, have an air hose connected thereto.

An internal channel 8 connects the second port 7 to the first port 6 at the attachment section 3. As shown in FIG. 6A, a first port 6 is disposed at the attachment section 3. The attachment section 3 can be attached to a mount, for example, a quick-change mount 5 via fasteners inserted through openings 20. A vacuum or compressed air can be introduced into the internal channel 8 via the first port 6. The internal channel 8 extends through the gripper head body 2 to the second ports 7. In the embodiment according to FIG. 6A, the gripper head body 2 extends diagonally away from a mounting surface 21. The gripper head body 2 curves further away from the attachment section 3 in a transition from the intermediate section 15 to the tool section 4. FIG. 6B shows a section view along line A-A of FIG. 6A. As shown in FIG. 6B, the internal channel 8 may increase in cross-sectional area at the transition from the intermediate section 15 to the tool section 4.

The gripper body further includes an extension section and an arcuate section 13. The attachment section 3 transitions to an intermediate section 15 which in turn transitions into the arcuate section 13. The arcuate section 13 transitions into the tool section 4.

As shown in FIG. 6B, the attachment section 3 of the gripper head 1 defines a first plane X. The intermediate section 15 extends at an acute angle from the first plane X. The arcuate section 13 curves away from the first plane X. The tool section 4 defines a second plane Y. The second plane Y is perpendicular to the first plane X according to the embodiment shown in FIG. 6B.

Figure 7:
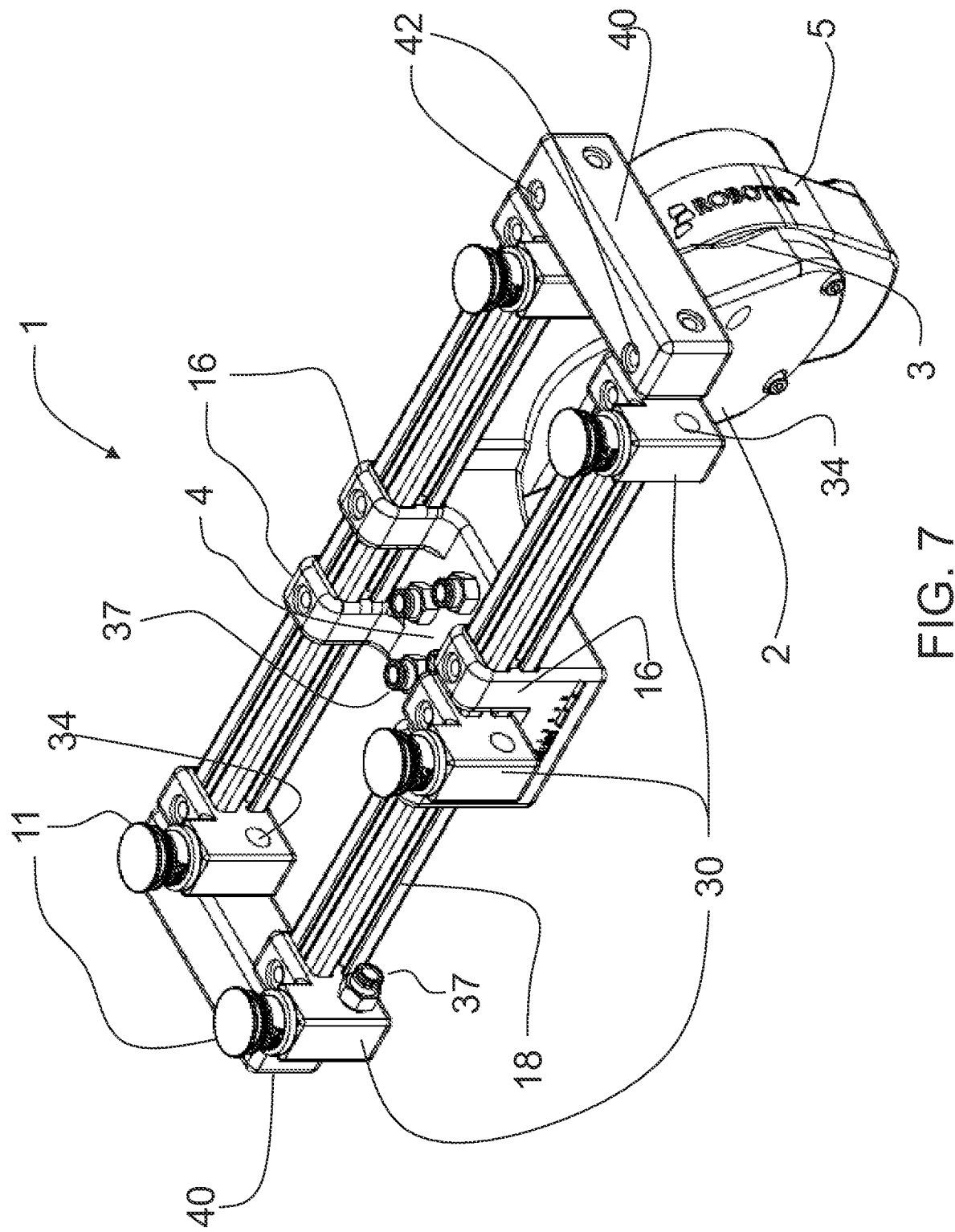
FIG. 7 shows the gripper head body of FIG. 5 equipped with profile sections, suction cup mounts and suction cups.

FIG. 7 shows the gripper head body 2 of FIG. 5 attached to a quick-change mount 5. The gripper head 1 further has two profile sections 18. The gripper head body 2 includes two front fittings 16 each of which define a pocket for a profile section 18. The pockets from the two front fittings 16 are aligned so that a single profile section can be inserted through each fitting via the pockets. The gripper head body 2 further includes two rear fittings 16. The pockets of the rear fittings 16 are aligned in a similar manner with respect to each other as the front fittings 16 and are configured to conjointly receive a second profile section 18.

Figure 8A:
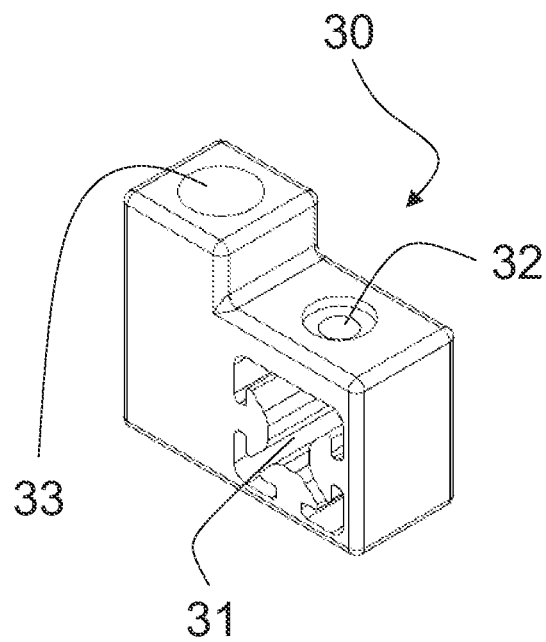
FIGS. 8A and 8B show a suction cup mount of FIG. 7 in more detail.
Figure 8B:
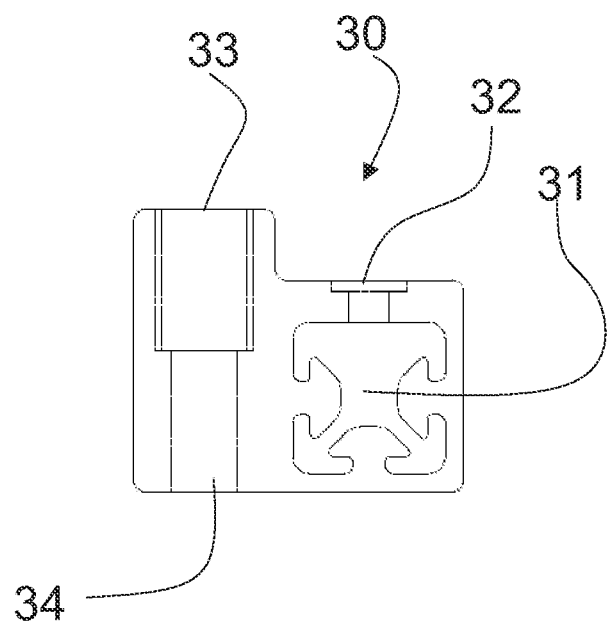

The gripper head 1 of FIG. 7 further has five suction cup mounts 30. The suction cup mounts 30 are attached to the profile section 18 via mount pockets 31. The profile section 18 is inserted through the mount pocket 31 of the suction cup mount 30. As shown in FIG. 7, the mount pocket 31 can surround the profile section 18. The position of the suction cup mount 30 can be adjusted by sliding the suction cup mount 30 along the profile section 18. The suction cup mount 30 can be fixed in place on the profile section 18 via a fastening or locking mechanism. The suction cup mount 30 is shown in more detail in FIGS. 8A and 8B. In the exemplary embodiment of the suction cup mount 30 shown in FIGS. 7, 8A and 8B, the suction cup mount 30 is fastened to the profile section 18 via a standard t-nut and bolt, but can be attached in relation thereto via any suitable attachment methods. The t-nut is inserted or threaded into opening 32 and projects downward so as to hold the suction cup mount 30 in place on the profile section 18.

Figure 10:
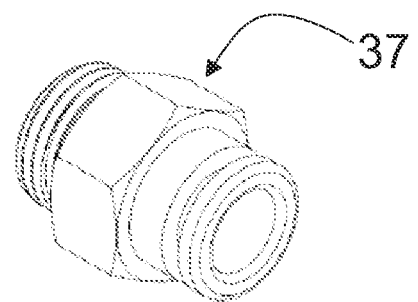
FIG. 10 shows an air hose connector.

The suction cup mount 30 further defines a receptacle 33 for a stem 12 of a suction cup 11. The suction cup mount 30 has a hose connection 34. A hose or other connector can be attached to the hose connection 34. The hose or other connector connects one of the second ports 7 to the hose connection 34. Via this connection, a vacuum or compressed air can be conveyed to the suction cup 11 inserted into the receptacle 33. The air hose can be connected to the second port 7 and to the hose connection 34 via a hose connection fitting 37 shown in FIG. 10.

Figure 11:
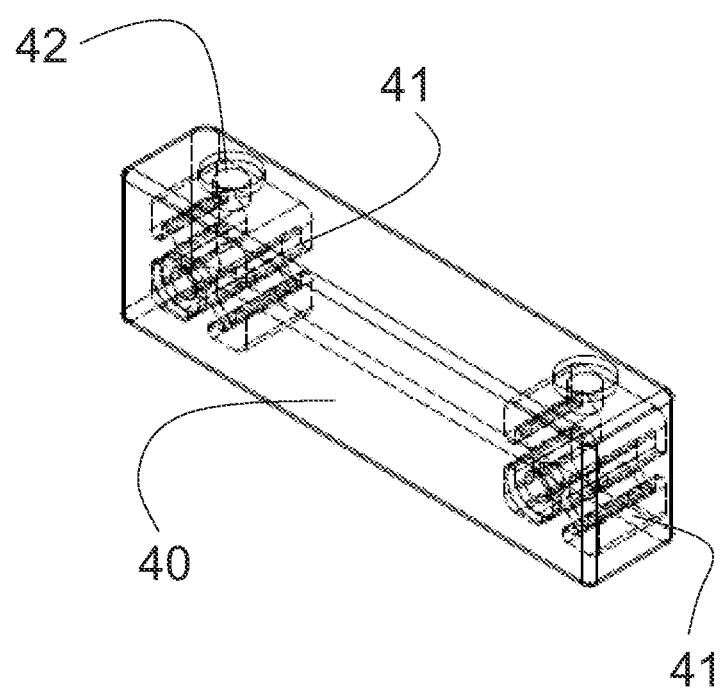
FIG. 11 shows an end cap of the gripper head of FIG. 7.

The gripper head 1 also includes an end cap 40. The end cap 40 slips over the ends of the two profile sections 18. The end cap 40 can be fastened to holes in the profile section via fasteners, for example, button head cap screws. FIG. 11 shows an embodiment of an end cap 40. The end cap 40 defines two end cap pockets 41. The first end cap pocket 41 is configured to receive a first end of a first profile section 18 while the second end cap pocket 41 is configured to receive a first end of a second profile section. The end cap 40 further defines a first end cap bore 42 configured to fix the end cap 40 on the end of the first profile section 18 via, for example, a fastener. The end cap further defines a second end cap bore 42 for fixing the end cap 40 on the second profile section 18. A second end cap 40 can be arranged over the second ends of the two profile sections 18. The end cap 40 can, for example, be made of aluminum or another suitable material.

Two end caps 40 are shown in FIG. 7, one arranged at each side of the gripper head 1. It shows the end cap pockets 41 slipped over the end of the profile sections 18 as well as the end cap bores 42 for the fasteners. This end cap 40 allows for longer length extrusions to be used for gripper head assemblies. By mounting the end caps the entire gripper head becomes very stable.

Figure 12A:
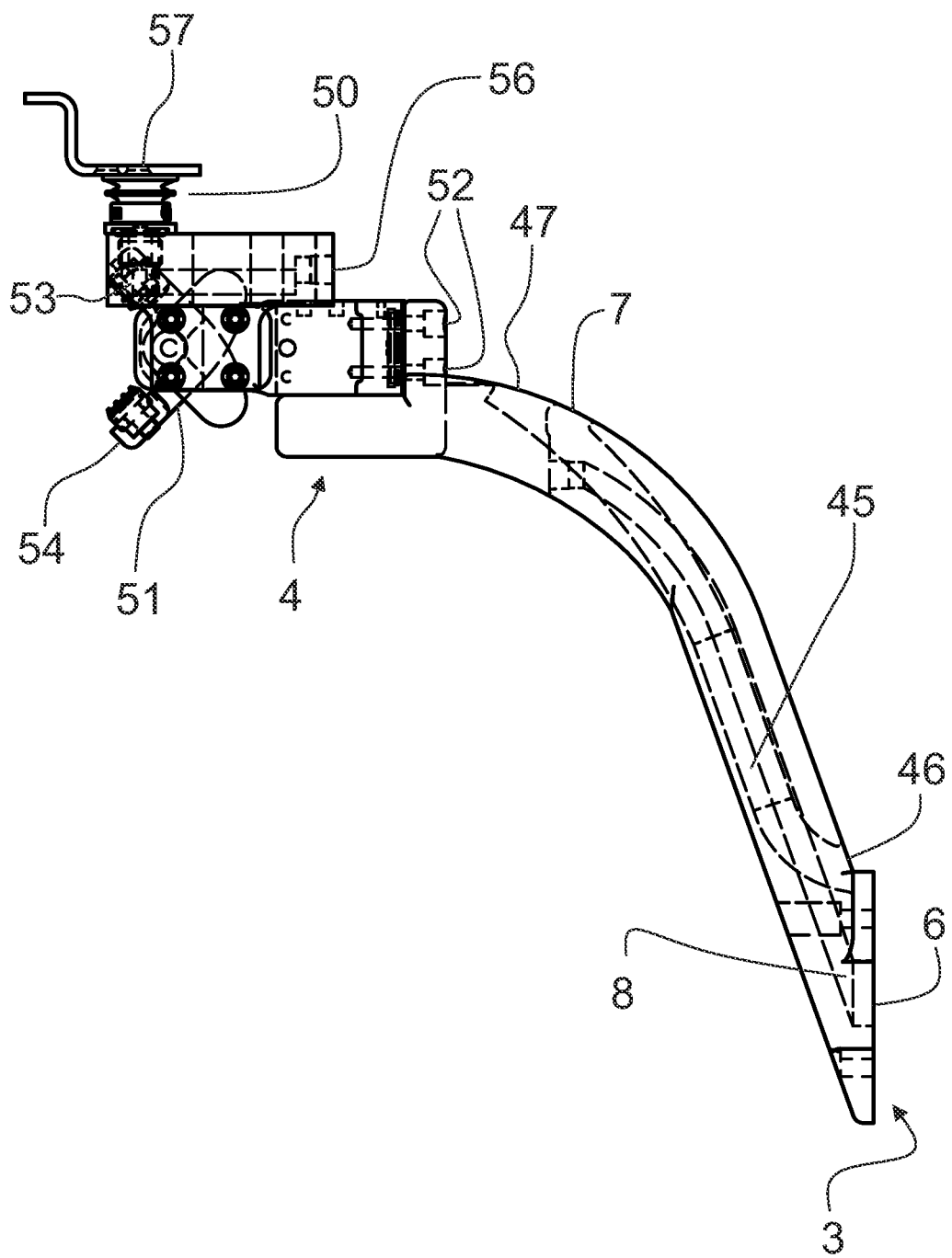
FIG. 12A shows an embodiment of a gripper head in a side view.

FIG. 12A shows a gripper head 1 in a side view. The gripper head 1 includes an internal passthrough channel 45, for example, for a cable. The passthrough channel 45 has a first opening 46 at the attachment section. The passthrough channel 45 leads through the gripper head body 2 and connects the first opening 46 at the attachment section 3 to a second opening 47 at the tool section 4. Passing the cable through the gripper head body 2 streamlines the assembled gripper head 1. By passing the cable through the gripper head body 2, the portion of the cable which is in the internal passthrough channel 45 cannot get hung up on work pieces, other equipment or other items in or near the work space of the gripper head 1. A hose inserted through the internal passthrough channel 45 can, for example, be used to supply compressed air to a tool or be used for removing debris and dust. Other examples include cables for laser measuring devices, cables for a servo motor, cables for closed loop feedback devices, for example, cables for proximity switches on gripping devices for indicating gripper open or gripper closed. Hydraulic lines, for example, for a hydraulic motor or a hydraulic gripper, can also be inserted through the internal passthrough channel 45.

The gripper head 1 of FIG. 12A can have two tools attached at the tool section 4. In the embodiment shown, the first tool 50 is embodied as a suction cup and the second tool 51 is a pinch gripper. The second tool 51 can be attached to the gripper head 1 via fasteners 52 or other suitable attachment methods. The pinch gripper shown in FIG. 12A includes two fingers 53 and 54 which can be actuated to grip or pinch a workpiece therebetween. Equipping the gripper head 1 with multiple tools enables the gripper head 1 to retrieve a work piece 57 and place the work piece in a processing station, for example a press brake, using the first tool 50 and to use the second tool 51, for example, for repositioning the work piece in the processing station, for removal from the work station and/or transportation to and deposition at a further processing station.

The tools 50 and 51 can be oriented in different directions. In the embodiment shown in FIG. 12A, the first tool 50 is directed in a vertical direction while the second tool 51 is directed in a horizontal direction. The internal channel 8 can, for example, be used to supply one of the two tools 50 and 51 with pressurized air or a vacuum while the passthrough channel(s) 45 can, for example, be used to connect one or both of the two tools 50 and 51 to a control unit, a power supply or the like. In the embodiment shown in FIG. 12A, the first tool 50 includes a port 56 which can be connected to the second port 7 of the internal channel 8. The first tool 50 can thereby be connected to a vacuum generator at the quick-change mount 5 via the internal channel 8 and a hose connecting the second port 7 to the port 56 of the first tool 50.

Figure 12B:
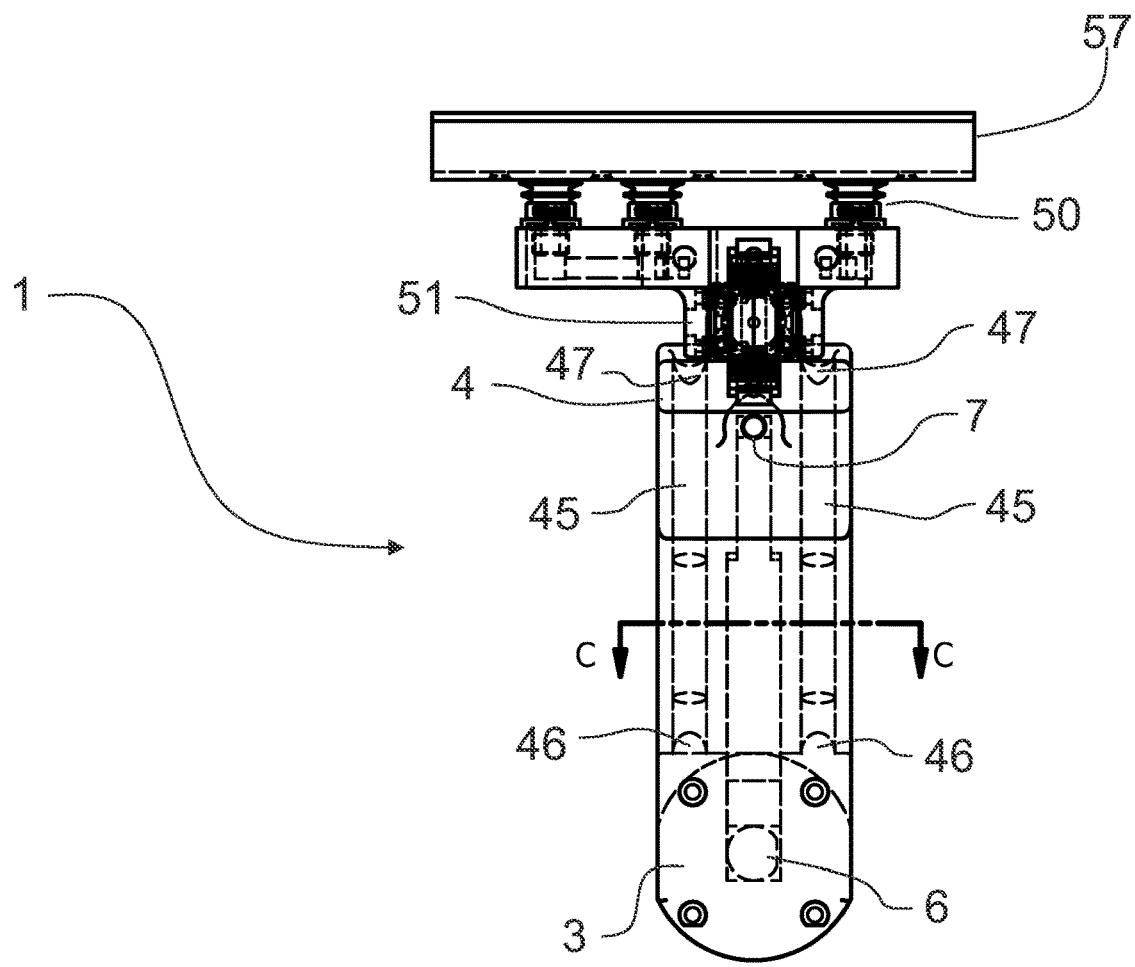
FIG. 12B is a further view of the gripper head of FIG. 12A.
Figure 12C:
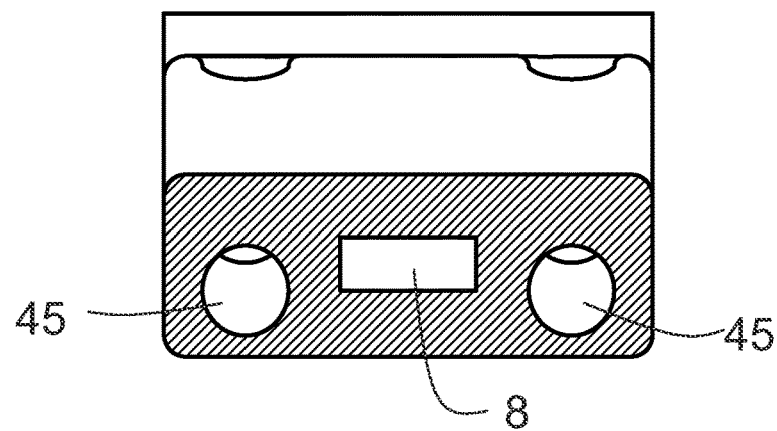
FIG. 12C is a section view along C-C of FIG. 12B.

As shown in FIG. 12B, the gripper head 1 can include multiple cable passthrough channels 45. In the shown embodiment, the first passthrough channel 45 is arranged on one side of the internal channel 8 while the second passthrough channel 45 is on the opposite side of the internal channel 8. In the shown embodiment, the internal channel 8 ends at a second port 7 whereat an air hose can, for example, be connected. FIG. 12C is a section view at C-C of FIG. 12B and shows the internal cross section of the gripper head body 2 with the internal channel 8 and two passthrough channels 45.

It is understood that the foregoing description is that of the preferred embodiments of the invention and that various changes and modifications may be made thereto without departing from the spirit and scope of the invention.

LIST OF REFERENCE NUMERALS

Gripper head 1
gripper head body 2
attachment section 3
tool section 4
quick change mount 5
First port 6
Second port 7
Internal channel 8
Connectors 9
Tool receptacle 10
Suction cup 11
suction cup stem 12
Arcuate section 13
Intermediate section 14
Intermediate section 15
Fitting 16
profile section 18
Through opening 20
Mounting surface 21
suction cup mounts 30
Suction cup mount pockets 31
Opening 32
Receptacle 33
Hose connection 34
hose connection fitting 37
End cap 40
First end cap pocket 41
end cap bore 42
Passthrough channel 45
First pass through opening 46
Second passthrough opening 47
First tool 50
Second tool 51
Fastener 52
Finger 53
Finger 54
Port 56
Work piece 57
Planes X, Y

What is claimed is:

1. A gripper head comprising:
  a gripper head body having an attachment section and a tool section defining an attachment region for a tool;
  said attachment section being configured to attach said gripper head body to a mount of a robot;
  said gripper head body having a first port at said attachment section and a second port at said tool section;
  said gripper body defining an internal channel mutually connecting said first port and said second port;
  said internal channel defining a cross-sectional area and being configured to pass air between said first port at said attachment section and said second port at said tool section;
  said cross-sectional area of said internal channel, in at least a segment of said internal channel, increasing in a direction away from said attachment section;
  wherein said gripper head body defines at least one receptacle for a suction cup stem at said tool section; and,
  said gripper head body defines three of said receptacles and each of said receptacles is operatively connected to said internal channel.

2. The gripper head of claim 1, wherein said gripper head body defines a first plane at said attachment section and a second plane at said tool section, said first plane being perpendicular to said second plane.

3. The gripper head of claim 1 further comprising a fitting disposed at said tool section and configured to receive and hold a profile section.

4. The gripper head of claim 3, wherein said fitting is a slip joint defining a direction of insertion for a profile section.

5. The gripper head of claim 1, wherein said gripper body further includes an intermediate section and an arcuate section, wherein said attachment section transitions to said intermediate section, said intermediate section transitions into said arcuate section and said arcuate section transitions into said tool section.

6. A gripper head comprising:
  a gripper head body having an attachment section and a tool section defining an attachment region for a tool;
  said attachment section being configured to attach said gripper head body to a mount of a robot;
  said gripper head body having a first port at said attachment section and a second port at said tool section;
  said gripper body defining an internal channel mutually connecting said first port and said second port;
  said internal channel defining a cross-sectional area and being configured to pass air between said first port at said attachment section and said second port at said tool section;
  said cross-sectional area of said internal channel, in at least a segment of said internal channel, increasing in a direction away from said attachment section;
  a fitting disposed at said tool section and configured to receive and hold a profile section; and,
  said fitting defining a through hole for a fastener for fixing the profile section in place.

7. A gripper head comprising:
  a gripper head body having an attachment section and a tool section defining an attachment region for a tool;
  said attachment section being configured to attach said gripper head body to a mount of a robot;
  said gripper head body having a first port at said attachment section and a second port at said tool section;

said gripper body defining an internal channel mutually connecting said first port and said second port;
said internal channel defining a cross-sectional area and being configured to pass air between said first port at said attachment section and said second port at said tool section;
said cross-sectional area of said internal channel, in at least a segment of said internal channel, increasing in a direction away from said attachment section;
at least one fitting disposed at said tool section and configured to receive and hold a profile section; and,
wherein four fittings are disposed at said tool section including a first fitting, a second fitting, a third fitting and a fourth fitting; said first fitting and said second fitting being configured to receive a first profile section and conjointly hold the first profile section; said third fitting and said fourth fitting being configured to receive a second profile section and conjointly hold the second profile section.

8. A gripper head comprising:
a gripper head body having an attachment section and a tool section defining an attachment region for a tool;
said attachment section being configured to attach said gripper head body to a mount of a robot;
said gripper head body having a first port at said attachment section and a second port at said tool section;
said gripper body defining an internal channel mutually connecting said first port and said second port;
said internal channel defining a cross-sectional area and being configured to pass air between said first port at said attachment section and said second port at said tool section;
said cross-sectional area of said internal channel, in at least a segment of said internal channel, increasing in a direction away from said attachment section;
wherein said gripper body further includes an intermediate section and an arcuate section, wherein said attachment section transitions to said intermediate section, said intermediate section transitions into said arcuate section and said arcuate section transitions into said tool section;
wherein said attachment section defines a first plane;
said intermediate section extends at an acute angle from said first plane;
said arcuate section curves away from said first plane; and,
said tool section defines a second plane perpendicular to said first plane.

9. A gripper head comprising:
a gripper head body having an attachment section and a tool section defining an attachment region for a tool;
said attachment section being configured to attach said gripper head body to a mount of a robot;
said gripper head body having a first port at said attachment section and a second port at said tool section;
said gripper body defining an internal channel mutually connecting said first port and said second port;
said internal channel defining a cross-sectional area and being configured to pass air between said first port at said attachment section and said second port at said tool section;
said cross-sectional area of said internal channel, in at least a segment of said internal channel, increasing in a direction away from said attachment section;
a fitting disposed at said tool section and configured to receive and hold a profile section;

wherein said fitting is a slip joint defining a direction of insertion for a profile section; and,
wherein said slip joint defines an opening configured to receive a fastener and said fastener is configured to engage a t-nut.

10. A gripper head comprising:
a gripper head body having an attachment section and a tool section defining an attachment region for a tool;
said attachment section being configured to attach said gripper head body to a mount of a robot;
said gripper head body having a first port at said attachment section and a second port at said tool section;
said second port being configured to receive an air hose connector;
said gripper body defining an internal channel mutually connecting said first port and said second port;
said internal channel being configured to pass air between said first port at said attachment section and said second port at said tool section; and,
wherein said gripper head body has a plurality of second ports disposed at said tool section, each connecting to said first port via said internal channel.

11. The gripper head of claim 10, wherein said tool section is configured to have two separate tools attached thereto.

12. The gripper head of claim 11, wherein one of said two separate tools is a pinch gripper.

13. The gripper head of claim 10, wherein said tool section is configured to have a pinch gripper and a suction cup attached thereto.

14. The gripper head of claim 13, wherein said pinch gripper and said suction cup are oriented in different directions.

15. The gripper head of claim 10, wherein the gripper head is configured to accept an extruded profile.

16. The gripper head of claim 10, wherein said gripper head body further defines a passthrough for at least one of a cable and a hose, said passthrough having a first opening at said attachment section and a second opening at said tool section.

17. The gripper head of claim 16, wherein said tool section is configured to have two tools attached thereto, wherein a first of said two tools is supplied with at least one of compressed air and a vacuum via said internal channel and a second of said two tools is connected to a cable inserted through said passthrough.

18. A gripper head assembly comprising:
a gripper head body having an attachment section and a tool section;
said attachment section being configured to attach said gripper head body to a mount of a robot;
a profile section;
at least one fitting disposed at said tool section and configured to receive and hold said profile section;
an air hose having a first end and a second end;
said gripper head body defining an internal channel;
said gripper head body having a first port at said attachment section and a second port at said tool section, wherein said internal channel connects said first port to said second port;
said second port being configured to receive said first end of said air hose;
said internal channel being configured to pass air between said first port at said attachment section and said second port at said tool section;
a suction cup having an attachment stem;

a suction cup mount having a vacuum cup receptacle configured to receive said attachment stem of said suction cup and an air hose receiver configured to receive said second end of said air hose;

said suction cup mount defining a profile slip fit pocket configured to engage said profile section and mount said suction cup mount on said profile section;

a change mount; and, said change mount including a vacuum generator configured to connect to said first port and generate a vacuum in said internal channel.

19. The gripper head assembly of claim 18, wherein said profile section is a first profile section, said at least one fitting is a first fitting, the gripper head assembly further comprising:

a second profile section; and, at least one second fitting at said tool section configured to receive and hold said second profile section.

20. The gripper head assembly of claim 19 further comprising:

a first end cap;

said first profile section and said second profile section each having a first end and a second end;

said first end cap being configured to receive said first end of said first profile section and said first end of said second profile section; and, a second end cap configured to receive said second end of said first profile section and said second end of said second profile section.

* * * * *